(12) United States Patent
Matsuoka et al.

(10) Patent No.: US 7,283,352 B1
(45) Date of Patent: Oct. 16, 2007

(54) SOLID ELECTROLYTIC CAPACITOR AND METHOD FOR MANUFACTURING THE SAME

(75) Inventors: Keiko Matsuoka, Izumisano (JP); Kazuhiro Kato, Higashiosaka (JP); Kunio Shibata, Nikko (JP); Yoshiyuki Fushimi, Nikko (JP)

(73) Assignees: Sanyo Electric Co., Ltd., Moriguchi-shi (JP); Furukawa Precision Engineering Co., Ltd., Nikko-shi (JP)

( * ) Notice: Subject to any disclaimer, the term of this patent is extended or adjusted under 35 U.S.C. 154(b) by 0 days.

(21) Appl. No.: 11/657,695

(22) Filed: Jan. 25, 2007

(30) Foreign Application Priority Data

Jan. 26, 2006 (JP) .............................. 2006-017210

(51) Int. Cl.
*H01G 4/228* (2006.01)
*H01G 9/00* (2006.01)
(52) U.S. Cl. ....................... 361/540; 361/538; 29/25.03
(58) Field of Classification Search ................ 361/540, 361/538, 532–533, 528; 29/25.03
See application file for complete search history.

(56) References Cited

U.S. PATENT DOCUMENTS 5,638,253 A * 6/1997 Hasegawa ................... 361/535
6,665,172 B1 * 12/2003 Kim et al. ................... 361/523
6,891,716 B2 * 5/2005 Maier et al. ................. 361/523
6,975,503 B2 * 12/2005 Abe et al. .................... 361/533
7,149,077 B2 * 12/2006 Ishijima ....................... 361/540

FOREIGN PATENT DOCUMENTS

JP       3157722       4/2001

* cited by examiner

*Primary Examiner*—Eric Thomas
(74) *Attorney, Agent, or Firm*—Kratz, Quintos & Hanson, LLP

(57) ABSTRACT

A portion of an anode lead frame 3 of a solid electrolytic capacitor 1 is bent to form a protruding portion 4 that protrudes toward an anode lead 20. The protruding portion 4 includes a first horizontal portion 41 positioned higher than and substantially parallel to the anode lead 20, a second horizontal portion 40 contacting the anode lead 20, a sloping portion 42 linking the inner end of the first horizontal portion 41 with the outer end of the second horizontal portion 40, and an auxiliary bent portion 43 bent upward from the inner end of the second horizontal portion 40 and substantially symmetrical with the sloping portion 42. A contact surface 46 of the second horizontal portion 40 with the anode lead 20 is formed flat, and a surface 47 of the second horizontal portion 40 on the opposite side to the contact surface 46 is formed with a rounded curvature.

4 Claims, 7 Drawing Sheets

SOLID ELECTROLYTIC CAPACITOR AND METHOD FOR MANUFACTURING THE SAME

BACKGROUND OF THE INVENTION

1. Field of the Invention

The present invention relates to a solid electrolytic capacitor that includes a lead frame, and a method for manufacturing the same.

2. Description of the Related Art

Conventionally, a solid electrolytic capacitor (1) having the configuration shown in FIG. 8 is known (see Japanese Patent No. 3157722). The solid electrolytic capacitor (1) includes a capacitor element (2) with a thin wire-like anode lead (20) protruding therefrom. An anode lead frame (3) is resistance welded to the anode lead (20), and a cathode lead frame (30) is attached to the peripheral surface of the capacitor element (2) by a conductive adhesive (26). The capacitor element (2) and base ends of both lead frames (3) and (30) are covered with a synthetic resin housing (5), while portions of the lead frames (3) and (30) that protrude outside the housing (5) are bent downward along the peripheral surface of the housing (5), and then horizontally along the base of the housing (5).

When forming the solid electrolytic capacitor (1), the capacitor element (2) with the lead frames (3) and (30) attached is deployed in a space (91) between removable upper and lower dies (9) and (90), as shown in FIG. 9. After injecting resin into the space (91), the dies (9) and (90) are removed to form the housing (5) covering the capacitor element (2). Tapered surfaces (5a) (see FIG. 8) are formed on lower side portions of the housing (5) due to the removal of the dies. The lead frames (3) and (30) are then bent downward along the peripheral surface of the housing (5).

The capacitor element (2) is obtained by sequentially forming a dielectric oxide film (21), a solid electrolytic layer (22) made of a conductive polymer, and carbon and silver paste layers (23) on the surface of an anode body (24) composed of a sintered valve metal such as tantalum to cover the anode body (24), as shown in FIG. 10. The anode lead (20) is made of a valve metal, and protrudes from the center of the anode body (24).

As shown in FIG. 8, the anode lead frame (3) forms a step portion (7) within the housing (5). The step portion (7) includes a first horizontal portion (41) positioned higher than and substantially parallel to the anode lead (20), and a second horizontal portion (40) contacting the anode lead (20). The anode lead frame (3) is bent from the end of the first horizontal portion (41) along the outside of the housing (5) to form a vertical portion (35).

Due to variation in length of the anode lead (20), the leading end (20a) of the anode lead (20) sometimes comes in close proximity to an intersection X between an extended surface of the anode lead (20) and the housing (5).

By positioning the upper end of the vertical portion (35) above the second horizontal portion (40) by the height of the step portion (7), room is provided between the intersection X and the vertical portion (35) by an amount equal to the horizontal distance of the tapered portion (5a) corresponding to the height of the step portion (7). Damage to the leading end of the anode lead (20) due to the vertical portion (35) contacting the leading end of the anode lead (20) when bending the anode lead frame (3) along the housing (5) to form the vertical portion (35) is thereby prevented.

The applicant was aware of the following problems with the above configuration in need of resolution.

Springback sometimes occurs because of the step portion (7) being formed by bending the metal anode lead frame (3). Here, springback indicates the deformation of the step portion (7) in such a way that the angle of bend widens after the metal has been bent, as shown by the angles Y and Z magnified in FIG. 11. Consequently, the anode lead (20) of the capacitor element (2) is attached to the second horizontal portion (40) of the anode lead frame (3) at an angle, as shown in FIG. 12, possibly causing variation in the size of the contact area between the anode lead (20) of the capacitor element (2) and the anode lead frame (3).

Also, if the anode lead (20) is welded to the second horizontal portion (40), as shown in FIG. 13, the capacitor element (2) welded at an angle pushes the cathode lead frame (30) upward, possibly resulting in the cathode lead frame (30) jutting out from the housing (5) and affecting the appearance of the solid electrolytic capacitor (1). Variation in the bonding strength of the capacitor element (2) occurs as a result, and reliability is brought into question.

Also, the following problems occur if the positional relation between the anode lead (20) and the anode lead frame (3) is out of alignment when the capacitor element (2) is attached to the cathode lead frame (30). The substantial contact area between the anode lead (20) and the anode lead frame (3) is narrowed because of the anode lead (20) and the anode lead frame (3) not being parallel. This results in problems such as weak bonding strength and increased ESR (Equivalent Series Resistance).

Further, if the second horizontal portion (40) is formed on a large scale with a die when mass producing the anode lead frame (3), the second horizontal portion (40) becomes rounded due to wearing of the die, possibly reducing the contact area with the anode lead (20).

There are also calls for further reductions in the size and increases in the capacity of capacitors of this type.

SUMMARY OF THE INVENTION

An object of the present invention, which was made in consideration of the above problems, is to provide a highly reliable solid electrolytic capacitor with improved bonding strength between the anode lead and the anode lead frame, and reduced ESR, etc. A further object of the present invention is to provide a solid electrolytic capacitor of reduced size and increased capacity in which the anode lead frame is made longer than an initial length by performing a pressing process to flatten out the anode lead frame.

A solid electrolytic capacitor comprises a capacitor element with a protruding anode lead, an anode lead frame connected to the anode lead, and a cathode lead frame attached to a peripheral surface of the capacitor element. The capacitor element, a portion of the anode lead frame, and a portion of the cathode lead frame are covered by a housing, and the anode lead frame has a protruding portion that is bent into a V-shape and protrudes toward the anode lead within the housing.

The protruding portion includes a first horizontal portion positioned higher than and substantially parallel to the anode lead, a second horizontal portion contacting the anode lead, a linking portion linking the first and second horizontal portions, and an auxiliary bent portion bent upward from the inner end of the second horizontal portion and substantially symmetrical with the linking portion.

An outer surface of the second horizontal portion where contact is made with the anode lead is formed into a flat contact surface, and an inner surface of the second horizontal portion on an opposite side to the contact surface is formed with a rounded curvature.

The contact surface of the second horizontal portion with the anode lead is formed by flattening the surface using a pressing process.

Further, a manufacturing method for the solid electrolytic capacitor comprises the steps of forming a protruding portion having a second horizontal portion at an end portion of an anode lead frame by performing a bending process or a deep drawing process on the anode lead frame; and flattening a contact surface of the second horizontal portion with an anode lead by performing a pressing process on the second horizontal portion, and forming a rounded curvature on a surface of the second horizontal portion on an opposite side to the contact surface.

EFFECT OF THE INVENTION

1. A protruding portion (4) of an anode lead frame (3) is formed by bending a portion of the anode lead frame (3) into a first horizontal portion (41), a linking portion (specifically, sloping portion (42) in FIG. 2), a second horizontal portion (40), and an auxiliary bent portion (43). When forming the protruding portion (4) of the anode lead frame (3), the bending load acting on both sides of the protruding portion (4) is symmetrical and balanced, because processing is preformed using a center impeller structure for pressing symmetrically with both ends of the protruding portion (4) held down. Any displacement due to springback of the anode lead frame (3) is thereby symmetrical, allowing the protruding portion (4) to be kept horizontal. Also, since the pressing load of the welding electrode is supported on both sides of the protruding portion (4) when welding the anode lead (20) to the second horizontal portion (40), the parallelism of the anode lead (20) and the second horizontal portion (40) is not disturbed during welding.

Consequently, the capacitor element (2) is correctly attached to the anode lead frame (3), increasing the substantial contact area between the anode lead (20) and the anode lead frame (3). Problems such as weak bonding strength and increased ESR resulting from incorrect attachment of the capacitor element (2) as in the prior art can thereby be resolved.

2. Also, because a contact surface (46) of the second horizontal portion (40) with the anode lead (20) is formed flat, the contact area between the contact surface (46) and the anode lead (20) is enlarged. In this respect also, the bonding strength between the anode lead (20) and the anode lead frame (3) can be enhanced, and ESR reduced. Further, because a surface (47) of the second horizontal portion (40) on the opposite side to the contact surface (46), that is, the underside of the second horizontal portion (40) is rounded for reinforcement, cracking or the like when the contact surface (46) of the second horizontal portion (40) with the anode lead (20) is pressed flat can be prevented.

3. Also, because the contact surface (46) of the second horizontal portion (40) with the anode lead (20) undergoes a pressing process for flattening out the protruding portion (4) using a die to make the protruding portion (4) thinner, the distance from the first horizontal portion (41) to the auxiliary bent portion (43) via the sloping portion (42) and the second horizontal portion (40) is lengthened in comparison to when a pressing process to flatten out the contact surface (46) is not performed. That is, because the contact surface (46) is formed by flattening out the protruding portion (4) to make it thinner, an equivalent amount of the material is protruded, elongating the sloping portion (42) and the auxiliary bent portion (43), and increasing the overall length of the protruding portion (4).

A vertical distance H between the first horizontal portion (41) and the second horizontal portion (40) can thereby be lengthened without changing the initial cutoff length of the anode lead frame (3), making it possible to also accommodate cases where the peripheral surface height or outer diameter of the capacitor element (2) is large. Being able to accommodate increases in the size of the capacitor element (2) enables the capacity of the solid electrolytic capacitor (1) to be increased.

BRIEF DESCRIPTION OF THE DRAWINGS

FIGS. 3A and 3B are illustrative diagrams showing the effects of a protruding portion in the present embodiment, while

DESCRIPTION OF THE PREFERRED EMBODIMENTS

Figure 10:
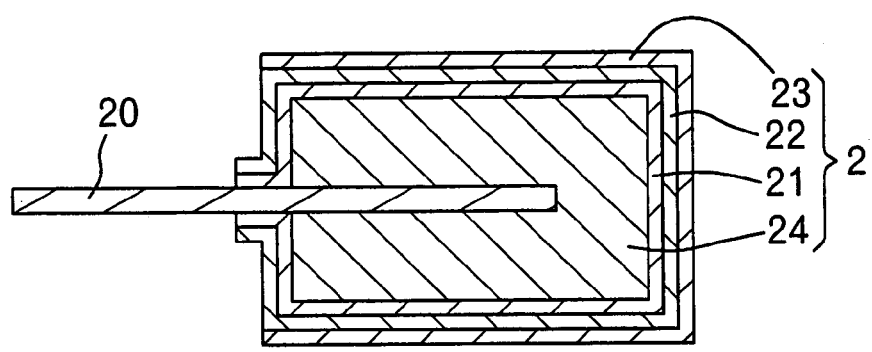
FIG. 10 is a cross-sectional view of a conventional capacitor element.
Figure 11:
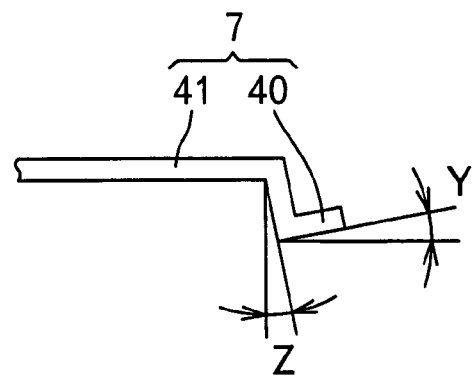
FIG. 11 is a front view showing a conventional lead frame.
Figure 12:
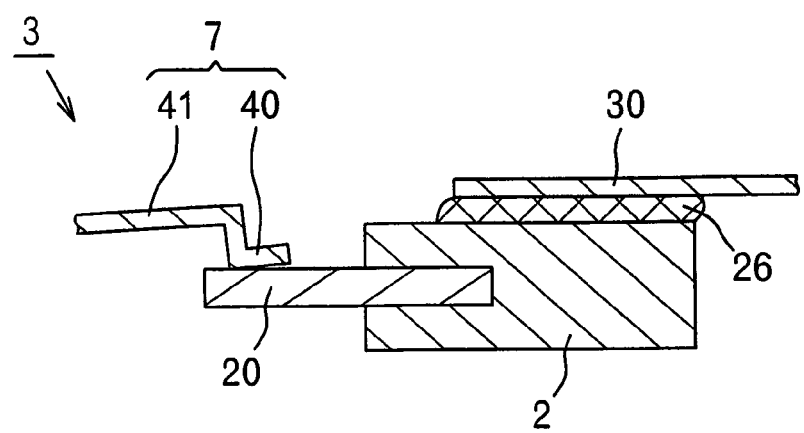
FIG. 12 shows a conventional capacitor element attached at an angle.
Figure 13:
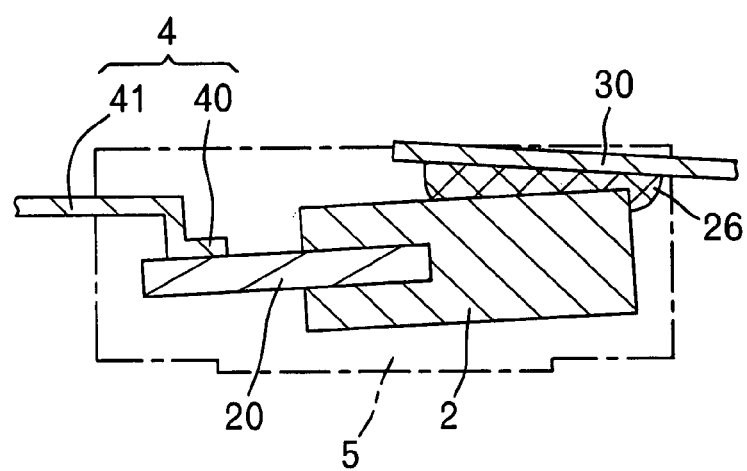
FIG. 13 shows a conventional capacitor element attached at an angle.

An embodiment of the present invention will be described below with reference to the accompanying drawings. A capacitor element (2) used in a solid electrolytic capacitor (1) of the present embodiment is the same as the prior art shown in FIG. 10. Here, polypyrrole is used to form the solid electrolytic layer (22) of the capacitor element (2), although other materials that may be used instead include conductive polymers such as polythiophene, polyaniline and polyfuran, and TCNQ (7,7,8,8-tetracyanoquinodimethane) complex. An alloy that includes copper, an iron-nickel alloy or the like is used to form the lead frames (3) and (30).

Apart from tantalum, the valve metal constituting the anode body (24) and the anode lead (20) may, for example, be niobium, titanium, or aluminum.

Figure 1:
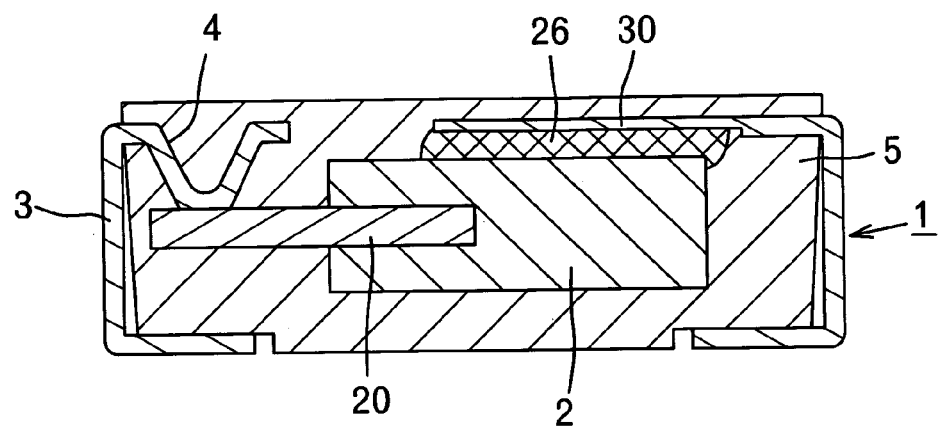
FIG. 1 is a front sectional view of a solid electrolytic capacitor.

FIG. 1 is a front sectional view of the solid electrolytic capacitor (1) of the present embodiment. A thin wire-like anode lead (20) protrudes from the capacitor element (2). An anode lead frame (3) is resistance welded to the anode lead (20), and a cathode lead frame (30) is attached to a peripheral surface of the capacitor element (2) with a conductive adhesive (26). The capacitor element (2), a portion of the anode lead frame (3) and a portion of the cathode lead frame (30) are covered with a synthetic resin housing (5), while portions of both lead frames (3) and (30) that protrude outside the housing (5) are bent downward along a peripheral surface of the housing (5) and then horizontally along the base of the housing (5).

Figure 2:
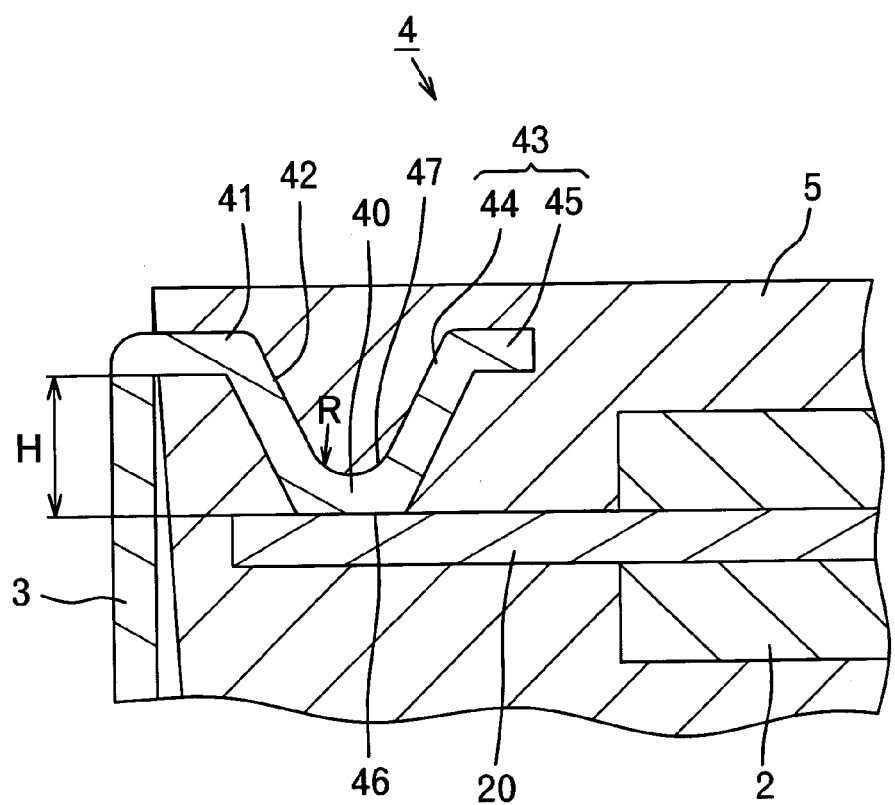
FIG. 2 is an enlarged view of the leading end of an anode lead frame.

FIG. 2 is an enlarged view of the leading end of the anode lead frame (3). The base end of the anode lead frame (3) is formed into a protruding portion (4) that protrudes downward using a pressing process. The protruding portion (4) includes a first horizontal portion (41) positioned higher than and substantially parallel to the anode lead (20), a second horizontal portion (40) contacting the anode lead (20), a first sloping portion (42) forming a linking portion that links the horizontal portions (40) and (41), and an auxiliary bent portion (43) bent upward from the inner end of the second horizontal portion (40) and substantially symmetrical with the first sloping portion (42). The auxiliary bent portion (43) includes a second sloping portion (44) that extends upwardly at an angle from the inner end of the second horizontal portion (40), and a third horizontal portion (45) that extends inwardly from an upper end portion of the second sloping portion (44). The first and third horizontal portions (41) and (45) are substantially the same height as the cathode lead frame (30) contacting the peripheral surface of the capacitor element (2) within the housing (5).

A contact surface (46) of the second horizontal portion (40) with the anode lead (20) is, as described later, flattened using an additional pressing process. A surface (47) of the second horizontal portion (40) on the opposite side to the contact surface (46) is formed with a rounded curvature R.

Because the protruding portion (4) is processed using a center impeller structure for pressing symmetrically on the first and second sloping portions (42) and (44), the bending load acting on both sides of the protruding portion (4) is symmetrical and balanced. Springback of the anode lead frame (3) is thereby cancelled out, and any displacement or tilting of the anode lead frame (3) is suppressed.

Also, since the pressing load of the welding electrode is supported on both sides of the protruding portion (4) when welding the anode lead (20) to the second horizontal portion (40), the parallelism of the anode lead (20) and the second horizontal portion (40) is not disturbed during welding.

Consequently, the capacitor element (2) is correctly attached to the anode lead frame (3), enabling problems such as weak bonding strength and increased ESR resulting from incorrect attachment of the capacitor element (2) as in the prior art to be resolved.

Since the contact surface (46) of the second horizontal portion (40) with the anode lead (20) is formed flat, the contact surface (46) contacts closely with the anode lead (20). This enables the bonding strength between the anode lead (20) and the anode lead frame (3) to be enhanced. In particular, forming the protruding portion (4) by bending the anode lead frame (3) made from a metal plate means that the contact surface (46) easily becomes rounded when there is a large vertical interval (H in FIG. 2) between the first and second horizontal portions (41) and (40). This gives rise to reduced bonding strength between the anode lead frame (3) and the anode lead (20), and increased ESR.

By performing the additional pressing process to flatten the contact surface (46), the contact area between the contact surface (46) and the anode lead (20) is increased. Consequently, the bonding strength between the anode lead (20) and the anode lead frame (3) can be enhanced and ESR reduced, even when there is a large vertical interval between the first and second horizontal portions (41) and (40).

Further, because the surface (47) of the second horizontal portion (40) on the opposite side to the contact surface (46), that is, the underside of the second horizontal portion (40) is formed with a rounded curvature R for reinforcement, cracking or the like when the contact surface (46) of the second horizontal portion (40) with the anode lead (20) is flattened can be prevented.

Large Vertical Interval H Between Horizontal Portions (41) and (40)

With solid electrolytic capacitors of this type, there are cases where it is desirable to enlarge the diameter of the capacitor element (2) in order to accommodate increased capacity. In this case, the vertical interval H between the first and second horizontal portions (41) and (40) needs to be widened to avoid contact between the peripheral surface of the capacitor element (2) and the auxiliary bent portion (43). This is described below.

Figure 3A:
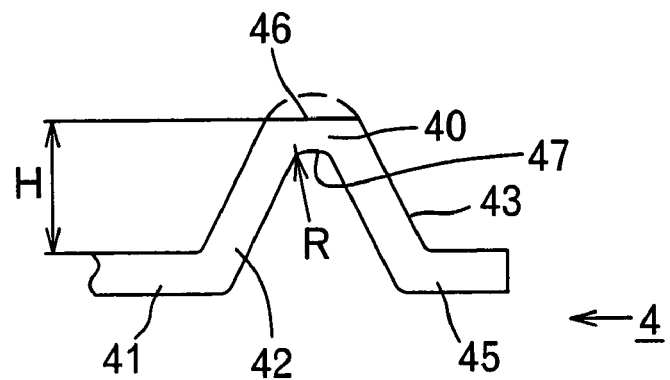
Figure 3B:
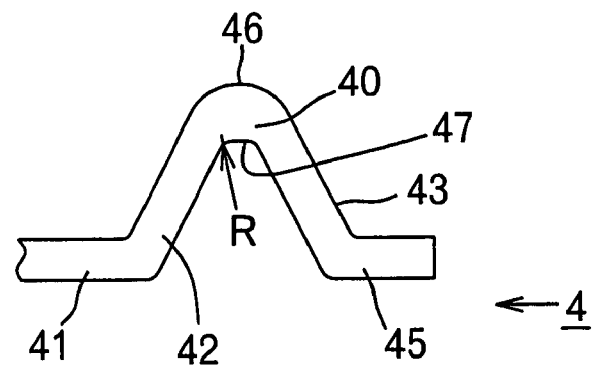

FIGS. 3A and 3B are illustrative diagrams showing the effects of the protruding portion (4) in the present embodiment, the protruding portion (4) having been inverted in comparison with FIG. 2. FIG. 3A shows the protruding portion (4) having undergone the pressing process to flatten the contact surface (46) after forming the contact surface (46) by flattening out the protruding portion (4) to make it thinner, while FIG. 3B shows the protruding portion (4) before undergoing the pressing process to flatten the contact surface (46). Consequently, the contact surface (46) in FIG. 3B is slightly rounded.

Because the pressing process in FIG. 3A used to form the contact surface (46) involves flattening out the protruding portion (4) to make it thinner, an equivalent amount of material is protruded, elongating the first sloping portion (42) and the auxiliary bent portion (43), and increasing the overall length of the protruding portion (4).

The vertical distance H from the first horizontal portion (41) to the second horizontal portion (40) can thereby be lengthened without changing the initial cutoff length of the anode lead frame (3), making it possible to accommodate cases where the peripheral surface height or outer diameter of the capacitor element (2) is large. Being able to accommodate increases in the size of the capacitor element (2) enables the capacity of the solid electrolytic capacitor (1) to be increased.

Figure 3C:
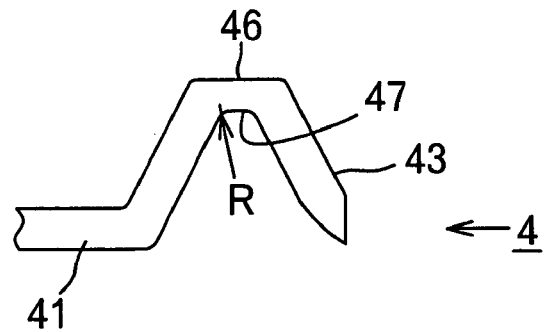
FIG. 3C shows an alternative protruding portion.

The auxiliary bent portion (43) may be left as punched, without providing the third horizontal portion (45), as shown in FIG. 3C. In this case, the protruding portion (4) can be moved toward the capacitor element (2) by an amount equal to the horizontal length of the third horizontal portion (45), thereby enabling the housing (5) of the solid electrolytic capacitor (1) to be reduced in size.

Manufacturing Method for Anode Lead Frame

A manufacturing method for the anode lead frame (3) will be shown below.

Figure 4:
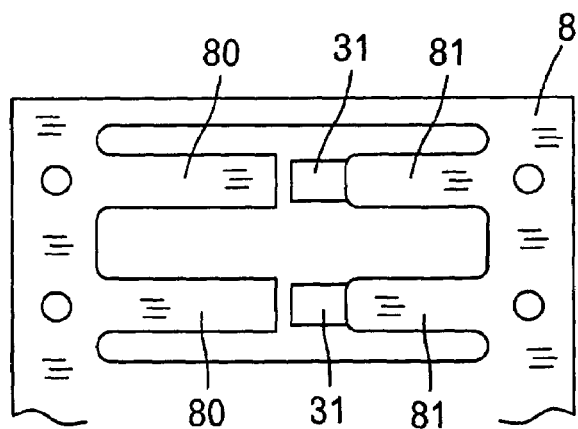
FIG. 4 is a plan view of a metal plate that is to form lead frames.

As shown in FIG. 4, a metal plate (8) forming the material for the lead frames (3) and (30) is punched. The lead frames (3) and (30) are cut out of the metal plate (8) to provide an anode constituent piece (80) and a cathode constituent piece (81) separated from one another. A recess (31) shown in FIGS. 4 and 5 is formed where the capacitor element (2) is to be set on the cathode constituent piece (81), thereby suppressing increases in the overall height of the capacitor.

Figure 5:
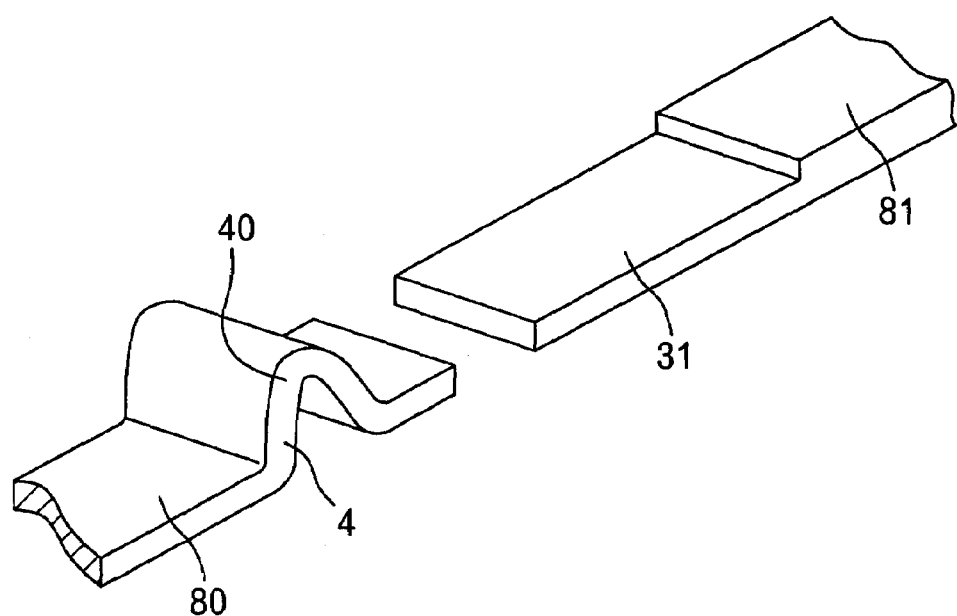
FIG. 5 is a perspective view showing the step of forming a lead frame.

Next, as shown in FIG. 5, the protruding portion (4) is formed by bending the leading end of the anode constituent piece (80). In this case, the protruding portion (4) can also be formed by deep drawing, although the bending process is considered advantageous for giving height to the protruding portion (4). The deep drawing process may, of course, be used to form the protruding portion (4).

Figure 6:
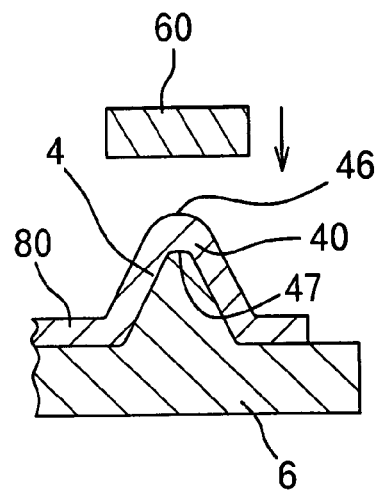
FIG. 6 is a cross-sectional view showing the step of forming a lead frame.

Next, as shown in the cross-sectional view of FIG. 6, a receiving die (6) having a rounded top surface is placed on the inner side of the protruding portion (4), and a pressing process is performed on the protruding portion (4) from above using a punch (60) having a flat working surface. The upper surface (i.e., the contact surface (46)) of the second horizontal portion (40) is thereby leveled, and the underside (47) of the second horizontal portion (40) is formed with a rounded surface.

Figure 7:
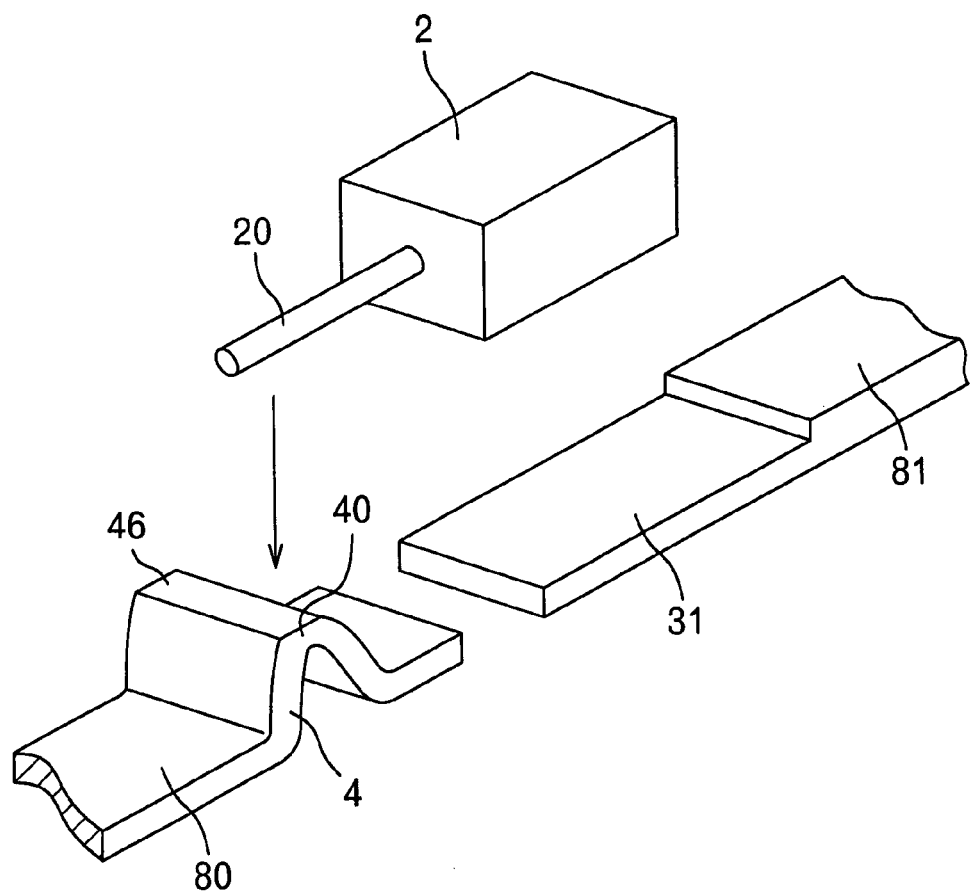
FIG. 7 is a perspective view showing the step of forming a solid electrolytic capacitor.
Figure 8:
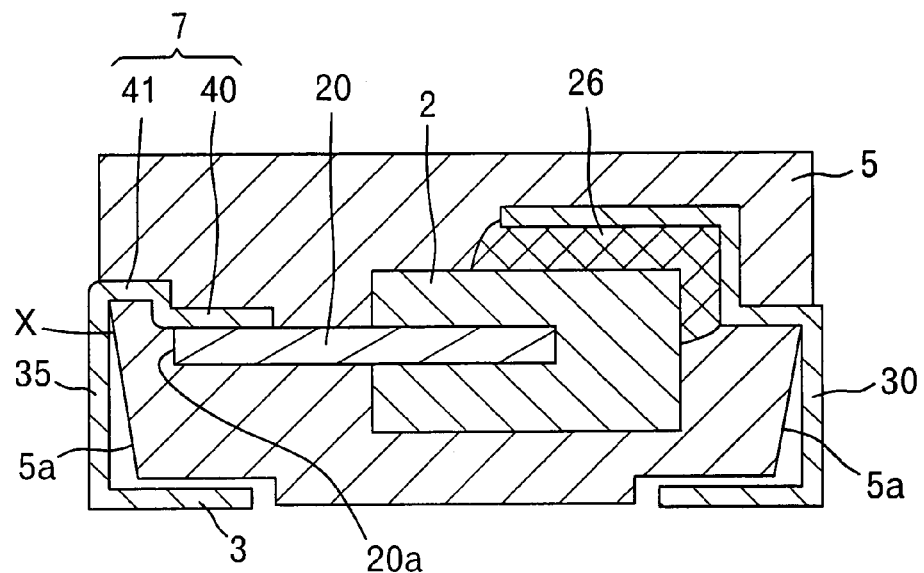
FIG. 8 is a front sectional view of a conventional solid electrolytic capacitor.
Figure 9:
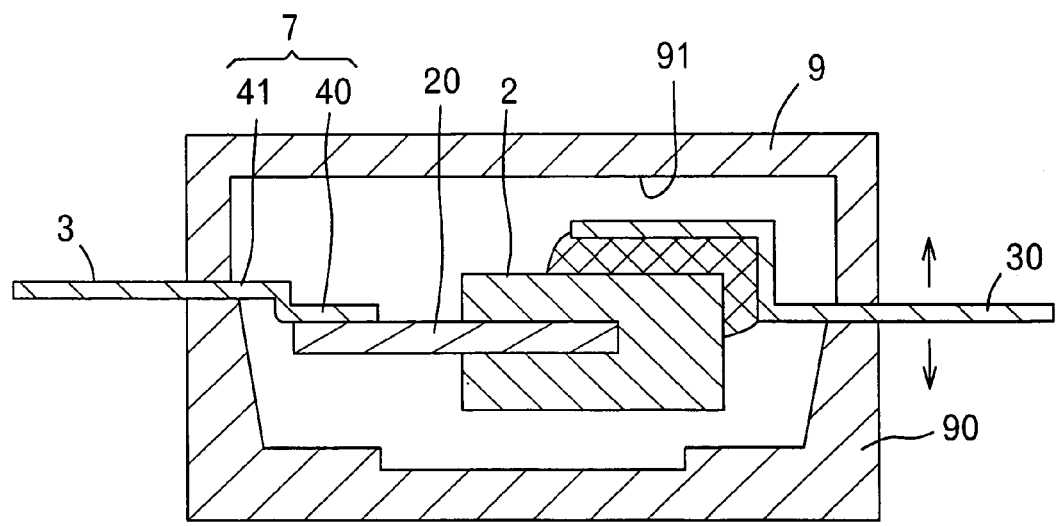
FIG. 9 shows a manufacturing step for a conventional electrolytic capacitor.

Next, as shown in FIG. 7, the anode lead (20) of the capacitor element (2) is placed on the contact surface (46) of the second horizontal portion (40) of the protruding portion (4), and the capacitor element (2) is placed in the recess (31). The anode lead (20) is resistance welded to the contact surface (46), and the capacitor element (2) is attached to the recess (31) with a conductive adhesive. Then, similarly to the prior art, the capacitor element (2) is covered with the housing (5), the anode and cathode constituent pieces (80) and (81) are cut off to form the lead frames (3) and (30), and the lead frames (3) and (30) are bent along the housing (5) to thereby obtain the solid electrolytic capacitor (1). Although shown in FIG. 7 as being rectangular, the capacitor element (2) may be cylindrical.

When attaching the capacitor element (2) to the anode lead frame (3), the capacitor element (2) is described above as being deployed above the anode lead frame (3), and then lowered. However, the anode lead frame (3) may instead be turned upside down, so that the protruding portion (4) protrudes downward, and the capacitor element (2) deployed below the anode lead frame (3), before being raised and attached.

What is claimed is:

1. A solid electrolytic capacitor comprising:
   a capacitor element with a protruding anode lead;
   an anode lead frame connected to the anode lead; and
   a cathode lead frame attached to a peripheral surface of the capacitor element, wherein the capacitor element, a portion of the anode lead frame, and a portion of the cathode lead frame are covered by a housing,
   wherein the anode lead frame has a protruding portion that protrudes within the housing toward the anode lead,
   the protruding portion includes a first horizontal portion positioned higher than and substantially parallel to the anode lead, a second horizontal portion contacting the anode lead, a linking portion linking the first and second horizontal portions, and an auxiliary bent portion bent upward from an inner end of the second horizontal portion and substantially symmetrical with the linking portion, and
   a contact surface of the second horizontal portion with the anode lead is flat, and a surface of the second horizontal portion on an opposite side to the contact surface has a rounded curvature.

2. The solid electrolytic capacitor according to claim 1, wherein the contact surface of the second horizontal portion with the anode lead is formed by a pressing process for flattening the protruding portion.

3. The solid electrolytic capacitor according to claim 1, wherein the first horizontal portion is positioned at substantially the same height from the anode lead as the cathode lead frame contacting the peripheral surface of the capacitor element.

4. A manufacturing method for the solid electrolytic capacitor as claimed in claim 1, comprising the steps of:
   forming a protruding portion by performing a bending process or a deep drawing process on a portion of an anode lead frame; and
   applying a pressing force to and flattening a contact surface with an anode lead by further performing a pressing process on a second horizontal portion of the protruding portion, and forming a rounded curvature on a surface of the second horizontal portion on an opposite side to the contact surface.

* * * * *